Feb. 13, 1968   G. W. KNECHT   3,369,088
ELECTRIC METER BY-PASS ARRANGEMENT
Filed July 27, 1966   3 Sheets-Sheet 1

INVENTOR.
GEORGE W. KNECHT
BY
*Hoggard & Calimafde*
ATTORNEYS

Feb. 13, 1968   G. W. KNECHT   3,369,088
ELECTRIC METER BY-PASS ARRANGEMENT
Filed July 27, 1966   3 Sheets-Sheet 2

INVENTOR.
GEORGE W. KNECHT
BY
Hopgood & Calimafde
ATTORNEYS

INVENTOR.
GEORGE W. KNECHT
BY
ATTORNEYS

United States Patent Office 3,369,088
Patented Feb. 13, 1968

3,369,088
ELECTRIC METER BY-PASS ARRANGEMENT
George W. Knecht, Brooklyn, N.Y., assignor to Murray Manufacturing Corporation, Brooklyn, N.Y., a corporation of New York
Filed July 27, 1966, Ser. No. 568,199
6 Claims. (Cl. 200—51.11)

My invention relates to an improved slide-type by-pass unit in a meter mount, for selectively by-passing an electric meter, as to assure uninterrupted service while temporarily removing the meter, for checking or for replacement.

Past and present by-pass units of the character indicated are illustrated in Patents 2,838,627 and 2,838,626, assigned to Murray Manufacturing Corporation. In such devices, the meter mount comprises a specially designed, single insulated base on which the two line clips and the two load clips (poised for reception of standard projecting contact lugs of an electric meter, such as a watt-hour meter) are accurately positioned, so that a specially designed by-pass slide with rigid by-pass connecting surfaces can function properly, establishing by-pass contact either to the base clips or to extensions of the base clips. In other words, in such systems the meter-mounting unit and slide unit are designed for each other, as parts of a complete single original installation.

However, many meter mounts in use today have no provision for by-passing the meter, and such mounts comprise a less elegant but more universal configuration wherein the clips for separate poles are on separately mounted independent bases. And in the normal course of assembly production, field replacement, and the like, there may be relatively wide fluctuations in spacing between the poles of the line clips and between the poles of the load clips, rendering prior techniques inapplicable to the provision of the by-passing function for such installations.

It is an object of the invention to provide an improved by-passing slide construction for a meter mount.

Another object is to provide such a slide having more universal applicability, as compared to existing practice.

It is also an object to provide such a slide which lends itself readily to field installation in a variety of existing meter-mount constructions.

A further object is to meet the above objects with a construction in which the additional function of slide lock-out can be readily applied to existing meter mounts, effective to preclude by-passing the meter as long as the meter is secured in place, but at the same time effective to assure uninterrupted service when a meter is removed, however briefly.

It is a general object to meet the foregoing objects with a structure which is inherently simple, foolproof, inexpensive, safe, reliable, rugged, and is inherently self-adapting to a range of pole spacings for the meter-mounting clips of existing installations.

Other objects and various further features of novelty and invention will be pointed out or will occur to those skilled in the art from a reading of the following specification, in conjunction with the accompanying drawings. In said drawings, which show, for illustrative purposes only, preferred forms of the invention:

Briefly stated, the invention contemplates a by-pass slide construction, having relatively universal applicability to a variety of standard existing meter mounts, in which spaced separate fixed insulated base units each carry a line clip (or jaws) and a load clip (or jaws) for insertably removable accommodation of the electrical meter, as ordinarily encountered in residential, professional and business service installations. The slide itself has a body of insulating material having guide surfaces adapted to locate with respect to and to slide along parts of two spaced base units. Independent rigid conductor bars are loosely carried by the slide for establishing the by-pass connection when desired; these bars are provided with elongated feet and cam formations, and they are spring-urged into interfering relation with the appropriate contact-clip locations on the spaced bases. The spring-resisted freedom for movement of the bars permits adaptation to a variety of pole and clip spacings. Two typical applications will be described.

Figures 1, 2:
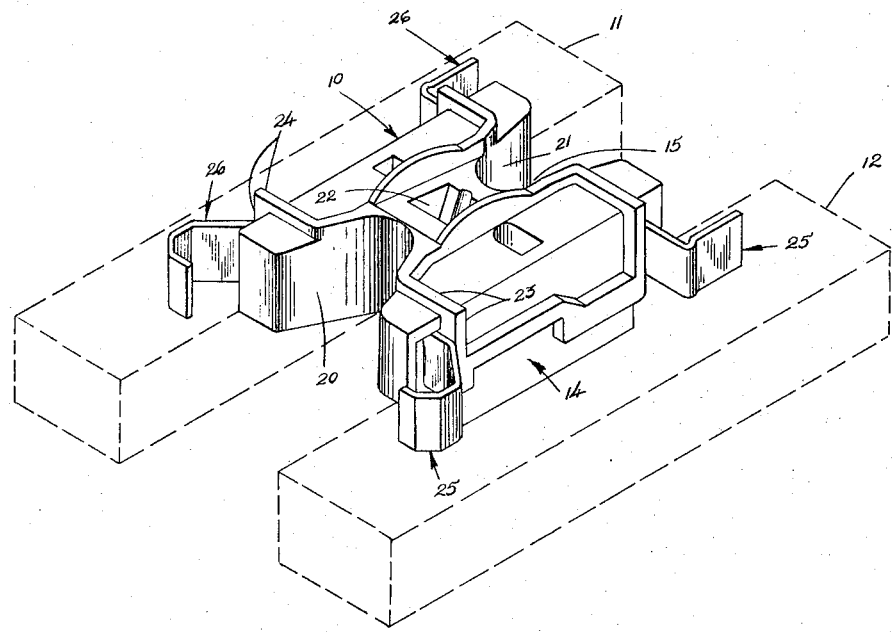
FIG. 1 is a top three-quarter perspective view of a by-pas slide of the invention.
FIG. 2 is a similar view, but taken for the underside of the slide of FIG. 1.

Referring to FIGS. 1 and 2 of the drawings, the invention is shown in application to a by-pass slide unit comprising a body 10 of insulating material adapted for location between and sliding upon two spaced clip bases 11–12, suggested only by phantom outline in FIG. 1. The body 10 comprises spaced upstanding side or retaining walls 13–14, bridge-connected by suitably reinforced top structure 15, and providing spaced elongated shoes or slide surfaces 16–17 in essentially a single plane. The slide surfaces 16–17 are intended ultimately for support on the upper surfaces of the two installed clip bases 11–12, and integral side walls 13–14 supported by offset lugs 18–19 project below the plane of slide surfaces 16–17 for loosely guided location between opposed adjacent side walls of bases 11–12.

The body 10 may be of suitable hard molded plastic, with reinforcing ribs and skirts serving various cooperating functions. For example, end skirts 20–21 not only strengthen the bridge structure but also are contoured with central recesses of a size to accommodate grasping fingers, for safe manipulation of the slide, as when making a field installation in the presence of an exposed live line. The step in slide surfaces 16–17 cooperates with projections integral with clip bases 11–12 to form stops which determine slide distance. The central part of the bridge is cored, as at 22, to universally accept various lock-out and actuator mechanisms, as will be pointed out for the two different illustrative applications of FIGS. 3 to 6 and 7 to 9, respectively. External ribbing, as at 23–24, enhances the rigidity of the bridge connection of side walls 13–14.

Viewed in another light the body 10 may be said to be configurated to define two oppositely directed commodious, generally U-shaped cavities for loosely controlled accommodation of the rigid generally U-shaped elongated conductor bars 25–26 which are relied upon for the by-passing function. These bars are best seen in FIG. 2 to comprise an elongated space 27 (27′) between outwardly projecting legs 28–29 (28′–29′) extending out the spaced side openings of each U-shaped recess. Laterally directed feet 30–31 (30′–31′) on the ends of legs 28–29 are formed for wiping contact with base clips for making and breaking by-pass connections.

In accordance with the invention, resilient means, such as leaf spring 32 for bar 26, is carried by body 10 and constantly outwardly urges the conductor bars, the outer limit being determined by the side wall 13. Spring 32 is shown formed with a central portion 33 referenced against the inner central wall of the U-shaped recess, and with outwardly bent arms 34–35 in stressed engagement with spaced locations on bar 26, so as to give effective resilient opposition to inward deflection of either or both of legs 28–29. It will be appreciated that the inward offset of lug 18 serves a retaining function for conductor bar 26, once inserted, in that spring 32 normally urges the same into retained position.

In FIGS. 3 to 6 the slide of my invention is shown in application to a ring-type meter mount contained in a case having a base or bottom panel 40 and a top or closure panel 41 with a flanged circular rim 42 projecting outwardly from the general plane of the top panel. The rim 42 is sized to accommodate and seat a standard watt-hour meter or the like and to accommodate a sealing ring (suggested by phantom outline 43 in FIG. 4) for permanently retaining an installed meter in place.

Permanently secured on the bottom panel 40 are clip bases 44–45 in generally parallel spaced relation. Each base 44–45 is of insulating material and supports spaced line and load clips 46–46' and 47–47', respectively, the spacings being standard to intercept the standardized contact prong locations on conventional watt-hour meters. It will be appreciated that due to normally generous tolerances in the size and location of mounting holes in the bottom panel 40 and for mounting bolts 48 in the base 44 there will be a range within which individual clips 46–46' and 47–47' will be variously positioned and spaced. This matters not as far as accommodation of standard watt-hour meters is concerned because of the resilient nature of the clips, but existing by-pass slide constructions are not usable due to this variation in spacings.

Figure 3:
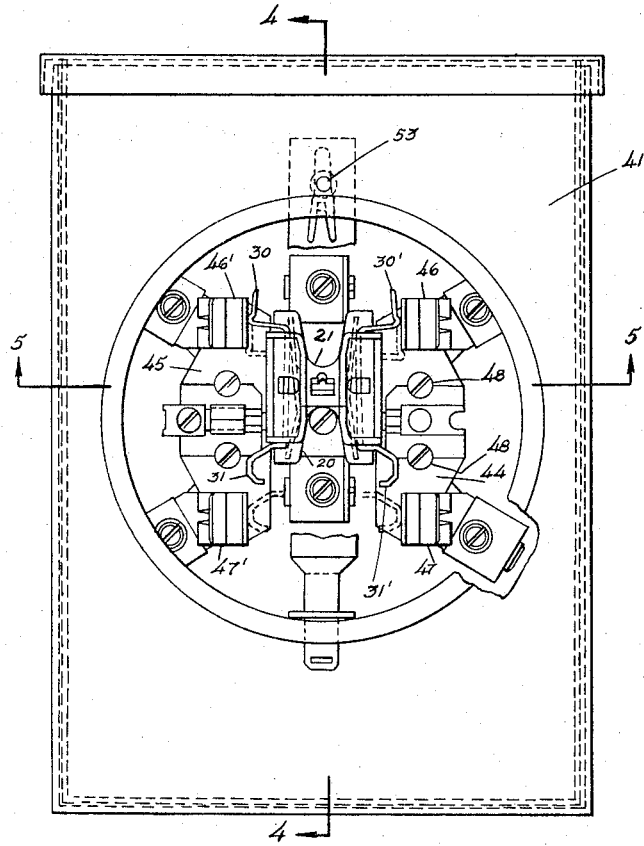
FIG. 3 is a partly broken-away plan view of a ring-type watt-hour meter mount incorporating the invention.
Figure 4:
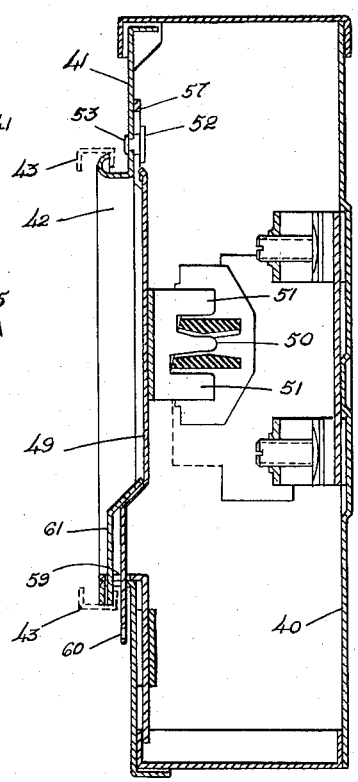
FIG. 4 is a sectional view in the plane 4—4 of FIG. 3.
Figure 5:
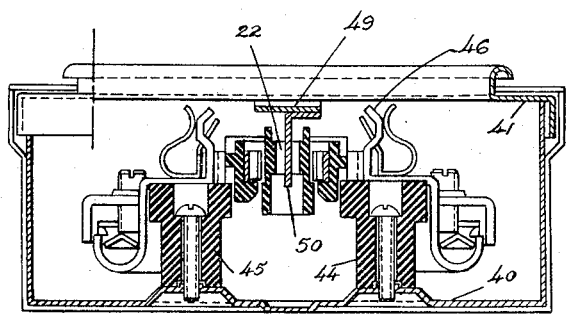
FIG. 5 is a sectional view taken substantially along the line 5—5 of FIG. 3.

However, the described spring suspension for the by-pass slide of FIGS. 1 and 2 will be seen to lend itself somewhat universally for application to existing 2-base mounts of the character depicted in FIGS. 3 and 5. The installation may be made in the field by manually grasping the finger recesses in the body skirts 20–21, placing one of the line contact feet (as, for example, the foot 30) in resiliently stressed abutment with the side face of clip 46'; by then displacing the slide body 10 along the slide axis, the contact of the other line pole is established at 30'–46. The slide body 10 may then be pressed into located sliding position on the upper exposed surfaces of the clip bases 44–45, all as explained in connection with bases 11 and 12 in FIG. 1. To provide the by-pass connection between line and load clips of each of the two poles, the slide body 10 may then be shifted down (in the sense of FIG. 3) until cam surfaces of the load feet 31–31' interfere with and ride up on inner walls of the load clips 47–47' which they respectively intercept. In FIG. 3, the by-passing orientation of the conductor-bar feet is suggested by dotted outline for the feet 30–30' and 31–31'.

Figure 6:
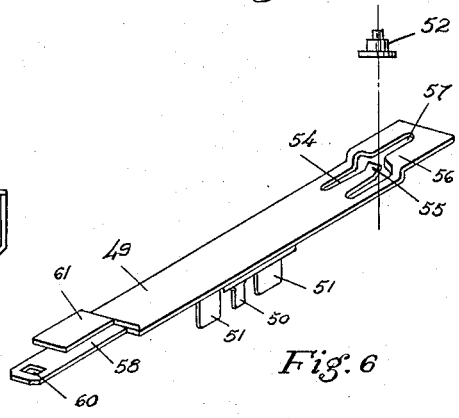
FIG. 6 is a perspective view of a control element for the arrangement of FIGS. 3 to 5.

In order to provide a lockout function for the by-pass slide as long as the meter is in installed position, I show in FIG. 6 an elongated bar or strap 49 extending diametrically across the meter opening and slidably guided by the cover or top panel 41. The bar 49 has lug elements as at 50 depending from the central part thereof and in register with central openings and recesses of the body 10. For example, the lug 50 may register with the central opening 22 and adjacent lugs 51 may register with the bottoms of the finger recesses of skirts 20–21.

The lockout bar 49 may, like the slide 10, be installed in the field as by employing a headed guide pin or rivet 52 which may be swaged or peened into fixed location at 53 on the underside of the panel 41, just inside the rim 42. For easy insertion of one end of the bar 49 into sliding engagement with the pin 52, a fork-shaped opening 54 is lanced into the end of bar 49 and a small offset is then formed in the tip of the resulting tongue 55 and in the slide engaging flat end 56. Retained sliding engagement of pin 52 in slot 57 is achieved by inserting the offset end 56 past the pin 52 so that the head thereof may be caught under the open side walls of slot 57 at the offset location. The bar is then pulled back, allowing tongue 55 to snap into a position effectively closing the slot 57 and thus locating pin 52 within slot 57.

At the other end of the bar 49 is a slightly greater offset extension 58 guided in a side aperture 59 in the mounting rim 42 and having an externally accessible part such as a piercing 60 for engagement with a tool to permit slide actuation, as when engaged by a sharp pointed tool. Ordinarily such actuation will be locked out or denied through the action of a lockout lug 61 secured to and forming part of the bar 51 and held in the upper position shown as long as the seal ring 43 is in place. However, when a meter is to be replaced, the seal ring 43 is removed so that the maintenance man may actuate (at 60 and through the bar 51) the by-pass slide from its upper inactive normal position to its lower position, shorting out the meter connections. This arrangement will assure no interruption of service while the maintenance man removes the meter for checking or replacement. Once the meter is replaced, the lockout bar is returned to its upper position and the by-pass connection thus disabled. Finally, the placement of the seal ring 43 assures against any interference with metering.

Figures 7, 8:
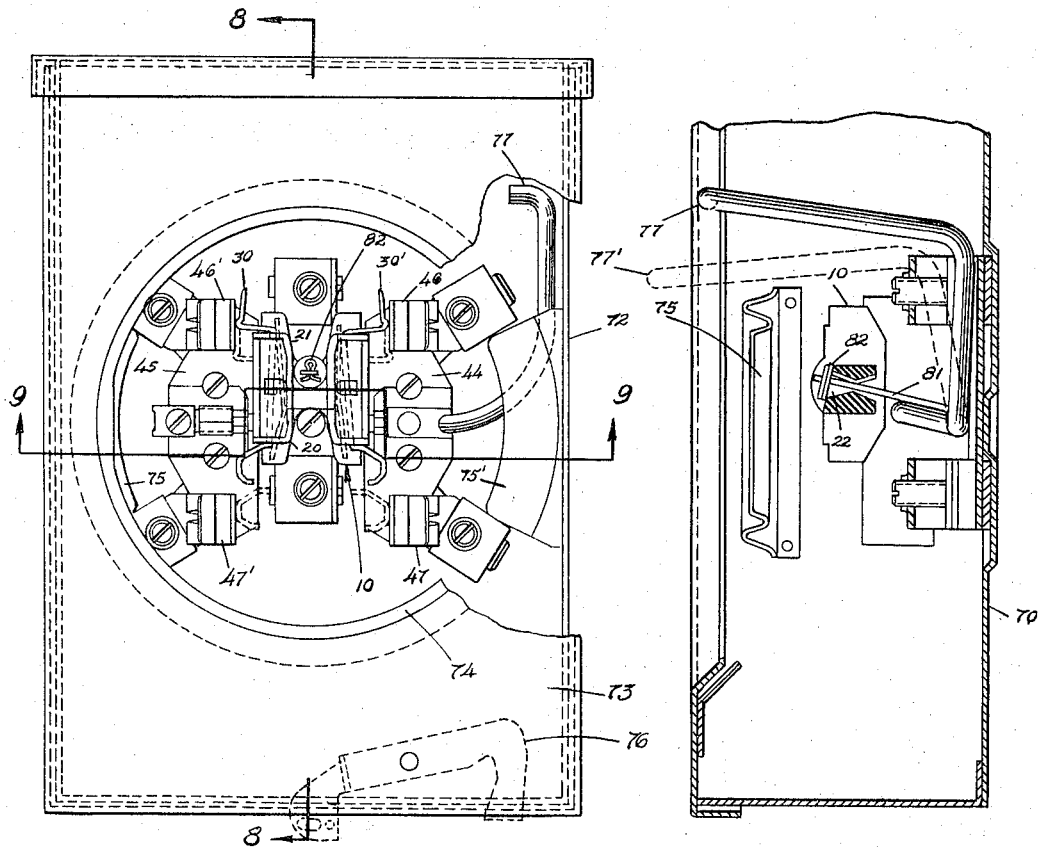
FIG. 7 is a partly broken-away plan view of a ringless type of watt-hour meter mount incorporating the invention.
FIG. 8 is a sectional view in the plane 8—8 of FIG. 7.
Figure 9:
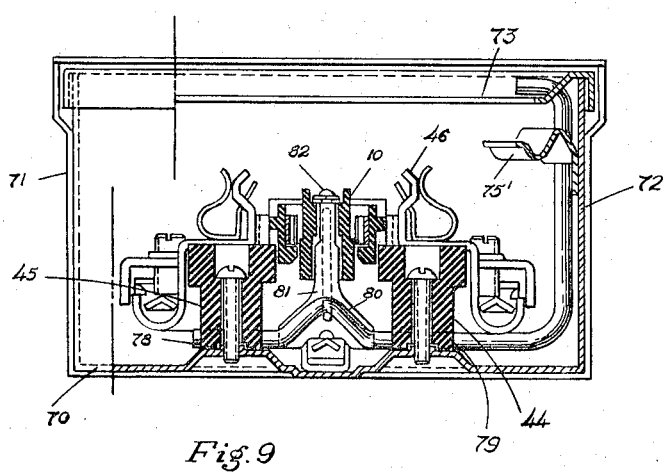
FIG. 9 is a sectional view in the plane 9—9 of FIG. 7.

In FIGS. 7, 8 and 9, I show application of the same slide structure of FIGS. 1 and 2 to another kind of meter mount, which can be called ringless to distinguish it from the form of FIGS. 3 to 6. The meter mount is contained within a box having a base or mounting panel 70, side walls 71, 72 and a top or closure panel 73. The top panel has a circular opening 74 through which a standard meter face may project, and spaced arcuate members 75–75' carried by the side walls 71 and 72 may engage and retain an inserted meter in place. The bases and line and load clips for the meter mount of FIGS. 7 to 9 may be similar to those already described in connection with FIGS. 3 to 5, and they have, therefore, been given the same reference numerals. Because of the different meter mount involved in FIGS. 7 to 9, however, a different lockout mechanism is shown to be applicable to the by-pass slide.

In FIGS. 7 to 9, cover 73 must be removed in order to replace an installed meter. For this purpose, the cover 73 is shown hinged at the top and provided with suitable locking means suggested at 76 for securing an installed condition. Once the cover 73 is removed, a handle 77 is exposed to enable actuation of the by-pass slide from its normally inactive position to the lower position in which it shorts out the meter; and again, this can be done before the meter is removed, thereby assuring against interruption of service. The handle 77 is shown to be but one end of a bent elongated crank member having spaced pivot or journaled support at 78–79 in suitably formed recesses in the bottoms of clip bases 44–45. Between pivot locations 78–79 the actuator is formed with an offset 80 to which is secured an upstanding arm 81 projecting through the central core opening 22 in the slide of FIGS. 1 and 2. At its upper end suitable retaining means such as a washer and cotter pin 82 holds the slide body 10 against loss of located relation with respect to the bases 44–45. It will be noted that in the normal non-by-passing position, the control handle 77 is up, assuring that the slide body 10 is in the up position and that it is safely retained in this position once the cover 73 is closed. Upon opening the cover the handle 77 may be actuated to down position, in which case it extends beyond the plane of the cover as suggested at 77' in FIG. 8. The action of actuator 77–80–81 will be seen, however, to be self-retracting upon closure of the cover and, of course, as it retracts it disengages the by-pass connection, thus assuring that when the meter mount is secured (within an installed meter), there will be no interference with the proper running of the meter.

It will be seen that I have described a universally applicable by-pass slide construction having simple adaptability to a range of spacings between poles and contacts of installed existing meter mounts. The effectiveness of by-pass connections established by my device is unimpaired whether the line clips are closer to each other than the load clips, or vice versa. The by-pass functions added to existing meter mounts with my invention are adaptable to lockout functions assuring against tampering and also assuring that meters may be serviced and replaced without any interruption of electrical supply to the customer.

While I have described the invention in detail for the preferred forms shown, it will be understood that modifications may be made without departing from the scope of the invention as defined in the claims which follow.

I claim:

1. In combination, a by-pass slide and an electrical meter mount having spaced parallel insulating bases with a line clip spaced from a load clip on each base, said slide comprising a body of insulating material with spaced shoes for guided support on the upper faces of said bases and a central downward projection extending below the plane of said shoes and having side walls for sliding location between said bases, integral bridge means above the plane of said shoes and rigidly interconnecting said shoes and said projection and defining an outwardly facing generally U-shaped space between each shoe and said projection, a first generally U-shaped relatively rigid conductor bar loosely received in one U-shaped space with spaced contact-engaging legs projecting laterally outwardly of the adjacent shoe, a second generally U-shaped relatively rigid conductor bar loosely received in the other U-shaped space with spaced contact-engaging legs projecting laterally outwardly of the adjacent shoe, and spring means retained by said body and constantly urging said conductor bars in opposite outward directions, whereby said slide may be selectively engaged in and disengaged from line-load by-passing relation with the poles of said bases, depending upon the selected slidably guided positioning of said slide on said bases, and with relatively uniform efficacy regardless of minor variations in spacing between line contacts and between load contacts of said meter mount.

2. The combination of claim 1, in which each conductor-bar leg includes an outwardly bent meter-contact-engageable foot for camming and wiping engagement with a meter-mount contact.

3. The combination of claim 1, in which said spring means comprises for each conductor bar a separate elongated leaf spring centrally located on said body and having spaced ends in resiliently flexed loading relation with said bar substantially in line with the respective legs of said bar, whereby said bars are differentially resiliently loaded.

4. The combination of claim 1, and including remotely actuable means carried by a part of said case and engaged with said slide for shifting said slide from one to the other of said slide positions, said last-defined means including an interlock element in interfering relation with completion of a meter installation in said mount when said slide is in the by-pass position and out of such interfering relation when said slide is in its other position.

5. The combination of claim 4, in which said remotely actuable means includes a hand crank pivotally mounted in said case and operatively associated with said slide.

6. The combination of claim 4, in which said remotely actuable means includes an elongated bar longitudinally guided for reciprocation in said case and overstanding said slide in general alignment with the slide axis thereof, said last-mentioned bar including downwardly depending lug means engaging said slide body.

References Cited

UNITED STATES PATENTS

| | | | |
|---|---|---|---|
| 1,757,744 | 5/1930 | Sachs | 200—16 |
| 1,815,577 | 7/1931 | Nenzel | 200—16 |
| 2,488,670 | 11/1949 | Koenig | 200—16 |
| 2,521,561 | 9/1950 | Batcheller | 200—16 |
| 2,838,626 | 6/1958 | Kuhr | 200—51.1 |
| 3,061,692 | 10/1962 | Fowler et al. | 200—16.1 |
| 1,907,010 | 5/1933 | Sachs | 317—108 |

FOREIGN PATENTS

| | | |
|---|---|---|
| 119,716 | 11/1930 | Austria. |
| 1,158,151 | 11/1963 | Germany. |

ROBERT K. SCHAEFER, *Primary Examiner.*

D. SMITH, JR., *Assistant Examiner.*

UNITED STATES PATENT OFFICE
CERTIFICATE OF CORRECTION

Patent No. 3,369,088                 February 13, 1968

George W. Knecht

It is hereby certified that error appears in the above numbered patent requiring correction and that the said Letters Patent should read as corrected below.

Column 6, line 10, strike out "and including" and insert instead -- wherein said electric meter mount includes a case and wherein said combination further includes --.

Signed and sealed this 29th day of April 1969.

(SEAL)
Attest:

Edward M. Fletcher, Jr.                 EDWARD J. BRENNER
Attesting Officer                       Commissioner of Patents